(12) United States Patent
Moloney et al.

(10) Patent No.: US 11,884,174 B2
(45) Date of Patent: Jan. 30, 2024

(54) OPTICAL COMMUNICATION SYSTEM FOR MANAGEMENT OF VEHICLE BATTERIES

(71) Applicant: TOYOTA MOTOR ENGINEERING & MANUFACTURING NORTH AMERICA, INC., Plano, TX (US)

(72) Inventors: Neil T. Moloney, Oak Park, MI (US); Shohei Nomura, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 210 days.

(21) Appl. No.: 17/471,434

(22) Filed: Sep. 10, 2021

(65) Prior Publication Data

US 2023/0079247 A1 Mar. 16, 2023

(51) Int. Cl.
*H02J 7/00* (2006.01)
*B60L 53/30* (2019.01)
*B60L 58/10* (2019.01)
*H04B 10/112* (2013.01)

(52) U.S. Cl.
CPC ............ *B60L 53/305* (2019.02); *B60L 58/10* (2019.02); *H04B 10/1127* (2013.01)

(58) Field of Classification Search
CPC .... B60L 53/305; B60L 58/10; H04B 10/1127; H04B 10/1143; H04Q 11/00; Y02T 10/70
USPC ............................................. 320/109; 701/22
See application file for complete search history.

(56) References Cited

U.S. PATENT DOCUMENTS 6,978,093 B2 12/2005 Clark
7,286,766 B2 10/2007 Shelton et al.
9,048,959 B2 6/2015 Voutilainen et al.
2013/0271072 A1 10/2013 Lee et al.
2015/0329003 A1* 11/2015 Li ........................... B60L 50/16
320/134

(Continued)

FOREIGN PATENT DOCUMENTS

WO 2002073845 A2 9/2009

OTHER PUBLICATIONS

Raijmakers, "Sensorless Temperature Measurements for Advanced Battery Management Systems," Research Dissertation, TU Delft University of Technology, Sep. 24, 2018, 227 pages, The Netherlands.

(Continued)

*Primary Examiner* — Zixuan Zhou
(74) *Attorney, Agent, or Firm* — HAYNES AND BOONE, LLP

(57) ABSTRACT

A vehicle is provided that includes a battery management system with an energy storage device configured to power the vehicle. The energy storage device includes a battery module with: at least one sensor, a processor, and an optical transceiver. The battery management system also includes a control unit to control the energy storage device, and a control unit optical transceiver configured for bidirectional free-space optical communication with the battery module optical transceiver via a free-space optical communication link. The battery module processor is configured to receive sensor readings and transmit them to the control unit via the free-space optical communication link. Based on the sensor readings, the control unit sends commands to the battery module processor via the free-space optical communication link.

20 Claims, 7 Drawing Sheets

(56) References Cited

U.S. PATENT DOCUMENTS

| | | | |
|---|---|---|---|
| 2016/0028129 A1 | 1/2016 | Raghavan et al. | |
| 2019/0217721 A1* | 7/2019 | Marcicki | H01M 10/613 |
| 2019/0339334 A1 | 11/2019 | Mikolajczak | |
| 2020/0150184 A1 | 5/2020 | Chao et al. | |
| 2021/0086627 A1 | 3/2021 | Campbell et al. | |

OTHER PUBLICATIONS

Frank Markus, "Cutting the Cord: EVs Are Moving to Wireless Battery Management," Motortrend, Jan. 19, 2021, https://www.motortrend.com/news/monitoring-battery-health-wirelessly-to-boostcost-weight-range/.

Frederic Lambert, "Gm Unveils Its Wireless Battery Management Tech, Will Power Next-gen EVs with Ultium Batteries," General Motors, Sep. 9, 2020, https://electrek.co/2020/09/09/gm-wireless-battery-management-tech-will-power-next-gen-evs-ultium-batteries/.

Greg Zimmer, "Wireless Battery Management Systems Highlight Industry's Drive for Higher Reliability," Linear Technology Corporation, date unknown, available at https://www.analog.com/media/en/technical-documentation/technical-articles/S65-Wireless_BMS_EN.pdf.

Y. Su et al., "Fiber Optic Sensing Technologies for Battery Management Systems and Energy Storage Applications," Sensors, MDPI, Feb. 17, 2021, 34 pages, https://www.mdpi.com/1424-8220/21/4/1397.

Sona Optical Wireless, "FSO Guide," 5 pages, http://www.fsona.com/technology.php?sec=fso_guide.

M. Hampson, "Taking Underwater Communications and Power to New Depths with Light," IEEE Spectrum, Jun. 1, 2021, 5 pages, https://spectrum.ieee.org/techtalk/sensors/remote-sensing/new-approach-could-take-underwater-communicationusing-light-to-new-depths.

A. Williams, "Free-Space Optics Beginning to Achieve Real-World Value," The International Society for Optics and Photonics (SPIE), Feb. 13, 2020, 6 pages, https://spie.org/news/free-space-optics-beginning-to-achieve-real-orldvalue?SSO=1.

First Alert, "What Is a Photoelectric Smoke Detector?", 1 page, https://www.firstalert.com/on/demandware.store/Sites-firstalert-Site/default/Content-Show?cid=what-is-a-photoelectric-smoke-detector.

\* cited by examiner

OPTICAL COMMUNICATION SYSTEM FOR MANAGEMENT OF VEHICLE BATTERIES

TECHNICAL FIELD

The subject matter described herein relates generally to electric vehicle traction batteries and, more particularly, to apparatus, systems, and methods for managing batteries wirelessly. These systems have particular but not exclusive utility for consumer and commercial electric vehicles, hybrid vehicles, and plug-in hybrid vehicles.

BACKGROUND

Electric, hybrid, and plug-in hybrid vehicles rely on large capacity traction batteries to operate electric traction motors. Such batteries may be fully or substantially charged by an external charging station, or may be incrementally or continuously charged by the vehicle itself, for example by an internal combustion engine, through regenerative braking, through photovoltaic panels on the surface of the vehicle, or by other means. Poor battery management can reduce the lifespan, maximum charge, or depth of discharge of a battery, or even cause runaway exothermic reactions (e.g., fires). This may be particularly problematic for vehicle traction batteries, which can be costly and which can contain a substantial store of energy.

Large batteries are typically made up of individual battery modules, which may themselves be made up of individual cells. At any given time, modules may be at different temperatures, different states of charge, or different voltages, or may be delivering different amounts of current at the same voltage in parallel. Because the individual behavior of cells and modules can vary, and there may be a "weakest link" cell or module within the battery, individual cell and module behavior should therefore be considered during charging, discharging, cooling, or balancing. Thus, large batteries are typically used with a Battery Management System (BMS), which may require separate communication wiring to each battery module. The resulting wiring harness adds weight, complexity, and potential failure modes to the battery and/or the BMS.

Large batteries, and their associated battery management systems, can have other problems as well, including electrical interference, high-voltage safety (e.g., for installation and maintenance personnel), and wiring harnesses, cables, and connectors that are subject to deterioration (e.g., fatigue, fretting, corrosion, fraying, debonding, or disconnection) in the chemical, vibration, and thermal stress environment of a battery, battery compartment, or other locations within the vehicle. A need exists for improved battery management technology that addresses these and other issues, as well as a general need to reduce the weight and cost of battery systems in electric vehicles (EVs) and hybrid vehicles.

The information included in this Background section of the specification is included for technical reference purposes only and is not to be regarded as subject matter by which the scope of the disclosure is to be bound.

SUMMARY

Disclosed are apparatus, systems, and methods for management of electric vehicle traction batteries using free-space optical communications. In the past, some systems have replaced the BMS wiring harness with optical fibers or wireless RF links. However, fiber optic cables and connectors are subject to many of the same sorts of physical degradation as electrical cables and connectors, while RF links are subject to development challenges in a poor RF environment in the battery, as well as RF interference and the generation of unwanted RF noise. Therefore, the present disclosure replaces the wiring harness with a series of free-space optical links that do not rely on an optical fiber or on RF data signals. Rather, communication links between a BMS and individual battery modules in an EV or hybrid vehicle are implemented using free-space optical communication (FSOC) technology to reduce weight, reduce cost, and improve robustness, security, and safety (e.g., high-voltage safety of workers exposed to the battery or BMS), while reducing sources of electrical interference and susceptibility to electrical interference.

The FSOC battery management system disclosed herein has particular, but not exclusive, utility for consumer and commercial electric vehicles and plug-in hybrid vehicles.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a vehicle with a battery management system including: an energy storage device configured to power the vehicle, the energy storage device including: a battery module; at least one battery module sensor associated with the battery module; a battery module processor associated with the battery module; and a battery module optical transceiver associated with the battery module. The energy management system of the vehicle also includes a control unit configured to control the energy storage device; and a control unit optical transceiver associated with the control unit and configured for bidirectional free-space optical communication with the battery module optical transceiver via a free-space optical communication link. The battery module processor is configured to receive sensor readings from the at least one battery module sensor and transmit information about the sensor readings to the control unit via the free-space optical communication link. The control unit is configured to, based on the information about the sensor readings, send commands to the battery module processor via the free-space optical communication link. Other embodiments of this aspect include corresponding computer systems, apparatus, and computer programs recorded on one or more computer storage devices, each configured to perform the actions of the methods.

Implementations may include one or more of the following features. In some embodiments, the at least one battery module sensor includes a temperature sensor, a current sensor, a voltage sensor, or a charge sensor. In some embodiments, the commands include at least one of a heating command, a cooling command, a balancing command, an output voltage or output current adjustment command, or a shutdown command. In some embodiments, the free-space optical communication link includes laser light. In some embodiments, the control unit is configured to determine a position of the battery module based on an angle, a signal strength, or a time of flight of the laser light, or an address encoded in the laser light. In some embodiments, the control unit is configured to detect a fire in the battery module based on a signal strength of the free-space optical communication link. In some embodiments, the energy storage device further includes a fluid at least partially surrounding the battery module. In some embodiments, a wavelength of the free-space optical communication link is selected for transmission through the fluid, such that the free-space optical communication link can transmit data bidirectionally through the fluid. In some embodiments, the free-space optical communication link includes a reflector. In some embodiments, the energy storage device includes a plurality of battery modules, and where each battery module of the plurality of battery modules includes: at least one battery module sensor associated with the battery module; a battery module processor associated with the battery module; and a battery module optical transceiver associated with the battery module and configured for bidirectional free-space optical communication with the control unit optical transceiver via a free-space optical communication link associated with the battery module, where the battery module processor is configured to receive sensor readings from the at least one battery module sensor and transmit the sensor readings to the control unit via the free-space optical communication link associated with the battery module. In some embodiments, at least one battery module of the plurality of battery modules is positioned on a different plane from another battery module of the plurality of battery modules. In some embodiments, the vehicle further included a second control unit optical transceiver associated with the control unit and configured for bidirectional free-space optical communication with the battery module optical transceivers of the at least one battery module positioned on the different plane. Implementations of the described techniques may include hardware, a method or process, or computer software on a computer-accessible medium.

One general aspect includes a battery management system with an energy storage device configured to power a vehicle, the energy storage device including: a plurality of battery modules, where each battery module of the plurality of battery modules includes: at least one sensor, a processor, and a battery module optical transceiver. The battery management system also includes a control unit configured to control the storage device. The battery management system also includes at least one control unit optical transceiver associated with the control unit and configured for bidirectional free-space optical communication with the respective battery module optical transceivers of the plurality of battery modules via a plurality of respective free-space optical communication links. Each respective battery module processor is configured to receive respective sensor readings from the respective at least one sensor and transmit information about the respective sensor readings to the control unit via the respective free-space optical communication link. The control unit is configured to, based on the information about the respective sensor readings, send commands to the respective battery module processors via the respective free-space optical communication links. Other embodiments of this aspect include corresponding computer systems, apparatus, and computer programs recorded on one or more computer storage devices, each configured to perform the actions of the methods.

Implementations may include one or more of the following features. In some embodiments, each of the respective sensor readings includes at least one of a battery module a temperature, a current, a voltage, or a charge. In some embodiments, the commands include at least one of a heating command, a cooling command, a balancing command, an output voltage or output current adjustment command, or a shutdown command. In some embodiments, at least one free-space optical communication link of the respective free-space optical communication links includes laser light. In some embodiments, the control unit is configured to determine a position of at least one battery module of the plurality of battery modules, based on an angle, a signal strength, or a time of flight of the laser light, or an address encoded in the laser light. In some embodiments, the control unit is configured to detect a fire in a battery module based on a signal strength of the respective free-space optical link of the battery module. In some embodiments, the energy storage device further includes a fluid at least partially surrounding the battery module, and where a wavelength of the respective free-space optical communication links is selected for transmission through the fluid, such that the respective free-space optical communication links can transmit data bidirectionally through the fluid. Implementations of the described techniques may include hardware, a method or process, or computer software on a computer-accessible medium.

One general aspect includes a method of controlling a battery of a vehicle, including providing an energy storage device configured to power the vehicle, the energy storage device including: a plurality of battery modules, where each battery module of the plurality of battery modules includes: at least one sensor, a processor, and a battery module optical transceiver. The method of controlling also includes providing a control unit configured to control the storage device. The method of controlling also includes, with a control unit optical transceiver associated with the control unit, establishing bidirectional free-space optical communication with the respective battery module optical transceivers of the plurality of battery modules via a plurality of respective free-space optical communication links. The method of controlling also includes with each respective battery module processor, receiving respective sensor readings from the respective at least one sensor and transmitting information about the respective sensor readings to the control unit via the respective free-space optical communication link. The method of controlling also includes with the control unit, based on the information about the respective sensor readings, send commands to the respective battery module processors via the respective free-space optical communication links, where the commands include at least one of a heating command, a cooling command, a balancing command, an output voltage or output current adjustment command, or a shutdown command. Other embodiments of this aspect include corresponding computer systems, apparatus, and computer programs recorded on one or more computer storage devices, each configured to perform the actions of the methods.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the method, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
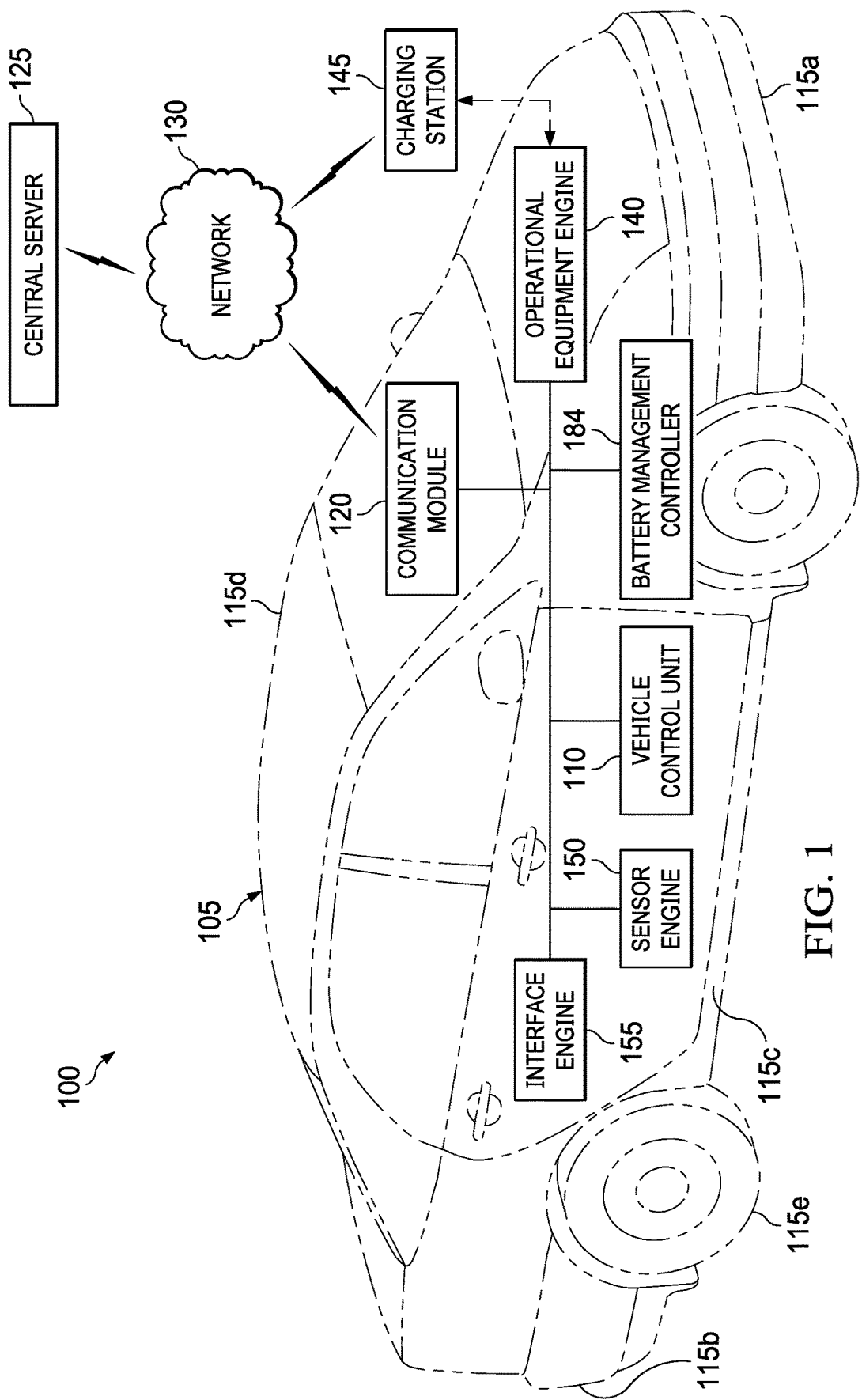
FIG. 1 is a diagrammatic illustration of a FSOC battery management system operable to monitor and control charging and discharging of a vehicle battery, according in accordance with at least one embodiment of the present disclosure.

Disclosed are apparatus, systems, and methods for management of electric vehicle traction batteries using free-space optical communications, e.g., optical communications that do not rely on an optical fiber or other solid medium for propagation of the optical signals. In the past, some systems have replaced the BMS wiring harness with optical fibers or wireless RF links. However, fiber optic cables and connectors are subject to many of the same sorts of physical degradation as electrical cables and connectors, while RF links are subject to development challenges in a poor RF environment in the battery, as well as RF interference and the generation of unwanted RF noise. Therefore, the present disclosure replaces the wiring harness with a series of free-space optical links that do not rely on an optical fiber or on RF data signals. Rather, communication links between a BMS and individual battery modules in an EV or hybrid vehicle are implemented using free-space optical communication (FSOC) technology to reduce weight, reduce cost, and improve robustness, security, and safety (e.g., high-voltage safety of workers exposed to the battery or BMS), while reducing sources of electrical interference and susceptibility to electrical interference.

The disclosed FSOC battery management system, provides several benefits relative to a wired system, including but not limited to: (1) reduced weight; (2) reduced wiring harness cost (connectors, pins, etc.); (3) galvanic isolation for high-voltage safety and performance; (4) reduced number of electrical connectors that are subject to deterioration such as fretting corrosion under vibration and thermal stress; and (5) support for modular battery stack design for service, manufacturing, and secondary use (stationary systems, etc.).

The current invention also provides a number of benefits relative to an RF wireless system, including but not limited to: (1) less affected by multipath environment than an RF solution; (2) readily suited for smoke detection for battery thermal runaway, reducing the need for distributed temperature sensors; (3) reduced susceptibility to RF interference or attack, potentially increasing security; (4) simpler electromagnetic compliance for design and certification (e.g., lower RF emissions); (5) battery module location is known by the system with physical position of transceiver, without the need for reprogramming during build and service replacement, leading to time and cost savings; (6) visual status indicator is possible for development, manufacture, and service, which saves time; (7) potential for use with flood cooling (which would present a poor environment for RF communications).

The systems, methods, and devices of the current disclosure employ free-space optical communication (FSOC) technology for the communication links between a BMS and the individual battery modules in the EV. A FSOC link can be implemented using, for example, a line-of-sight laser beam, though others types of FSOC links are also possible, including but not limited to visible, infrared, or and ultraviolet light communication, whether based on coherent light (e.g., lasers), monochromatic light (e.g., LEDs), light across a broad range of wavelengths, or light of multiple wavelengths, in either narrow or wide beams.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. It is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

These descriptions are provided for exemplary purposes and should not be considered to limit the scope of the removable vehicle battery system. Certain features may be added, removed, or modified without departing from the spirit of the claimed subject matter.

FIG. 1 is a diagrammatic illustration of a FSOC battery management system operable to monitor and control charging and discharging of a vehicle battery, in accordance with at least one embodiment of the present disclosure. In this example, a FSOC battery management system is referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 is operably coupled to, and adapted to be in communication with, the vehicle control unit 110. The communication module 120 is adapted to communicate wirelessly with a central server 125 via a network 130 (e.g., a cellular network such as 3G network, a 4G network, a 5G network, or a short-range network such as a Wi-Fi network, Bluetooth or the like). The central server 125 may provide information and services including but not limited to include location, mapping, route or path, and topography information.

An operational equipment engine 140 is operably coupled to, and adapted to be in communication with, the vehicle control unit 110. The operational equipment engine 140 is connectable to a charging station 145, as will be described in further detail below. A sensor engine 150 is operably coupled to, and adapted to be in communication with, the vehicle control unit 110. The sensor engine 150 is adapted to monitor various components of, for example, the operational equipment engine 140, as will be described in further detail below. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the FSOC battery management system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, the central server 125, the charging station 145, or components of the FSOC battery management system 100.

The vehicle 105 also includes a battery management controller (BMC) 184, the operation and uses of which will be described below. A reader of ordinary skill in the art will understand that other components or arrangements of components may be found in an electric vehicle (EV), hybrid vehicle, or plug-in hybrid vehicle, or that some of the components listed herein may be absent from some vehicles.

Figure 2:
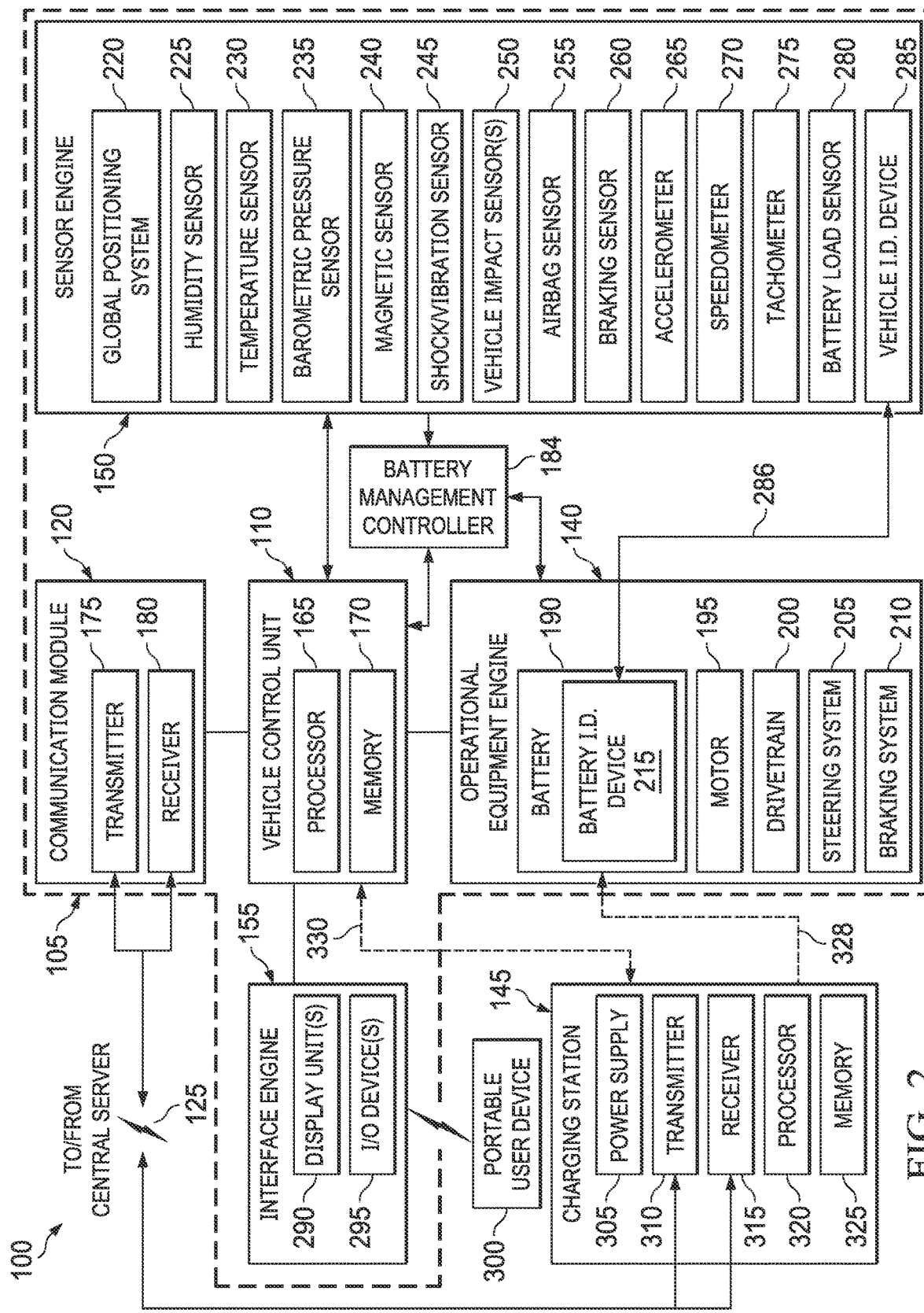
FIG. 2 is a diagrammatic illustration in a block-diagram form of at least a portion of the FSOC battery management system of FIG. 1, in accordance with at least one embodiment of the present disclosure.

FIG. 2 is a diagrammatic illustration in a block-diagram form of at least a portion of the FSOC battery management system 100 of FIG. 1, in accordance with at least one embodiment of the present disclosure. It is worth noting that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. The vehicle battery 190 is an energy storage device configured to power the vehicle 105. In an EV, hybrid, or plug-in hybrid vehicle, the battery 190 provides electrical power to the motor 195 to drive the wheels 115e of the vehicle 105 via the drivetrain 200. In some examples, in addition to providing power to the motor 195 to drive the wheels 115e of the vehicle 105 via the drivetrain 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes one or more battery identification devices 215. The battery identification device 215 may be adapted to communicate with one or more components of the sensor engine 150, and stores data identifying the vehicle battery 190 (or modules thereof) such as, for example, manufacturing information (e.g., production date, production facility, etc.), battery characteristic(s) information, battery identification number information, electric vehicle compatibility information, or the like.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220, a humidity sensor 225, a temperature sensor 230, a barometric pressure sensor 235, a magnetic sensor 240, a shock/vibration sensor 245, a vehicle impact sensor 250, an airbag sensor 255, a braking sensor 260, an accelerometer 265, a speedometer 270, a tachometer 275, a battery load sensor 280, a vehicle identification device 285, or any combination thereof. The sensors or other detection devices may be configured to sense or detect activity, conditions, and circumstances in an area to which the device has access, e.g., ambient conditions or conditions within a battery compartment. Sub-components of the sensor engine 150 may be deployed at any operational area where information on the driving of the vehicle 105 may occur. Readings from the sensor engine 150 are fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), or otherwise process (e.g., using the processor 165) the received performance data.

The braking sensor 260 is adapted to monitor usage of the vehicle 105's braking system 210 (e.g., an antilock braking system 210) and to communicate the braking information the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 may be adapted to communicate with the battery identification device 215 (or vice versa), as indicated by arrow 286. In some examples, the vehicle identification device 285 and the battery identification device(s) 215 may each communicate with the vehicle control unit 110 or the battery management controller 184.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a tough-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., a USB port or the Bluetooth communication interface). In an example, the portable user device 300 is a handheld or otherwise portable device which is carried into or near the vehicle 105 by a user who is a driver or a passenger on the vehicle 105. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, dashboard cameras, and/or any other suitable devices. In several examples, the portable user device 300 is a smartphone such as, for example, an iPhone® by Apple Incorporated.

In some examples, the charging station 145 includes a power supply 305, a transmitter 310, a receiver 315, a processor 320, and a memory 325. In some examples, one or the other of the transmitter 310 and the receiver 315 may be omitted according to the particular application for which the charging station 145 is to be used. In some examples, the transmitter 310 and the receiver 315 are combined into a transceiver capable of both sending and receiving wireless signals. The charging station 145 is adapted to recharge the vehicle battery 190, as indicated by arrow 328. In some examples, before, during, and/or after the recharging of the battery by the charging station 145, the charging station 145 is further adapted to send and/or receive data to and/or from the vehicle control unit 110, as indicated by arrow 330.

The vehicle 105 also includes a battery management controller (BMC) 184, to regulate charging and discharging of the battery 190 and energy delivery from the battery 190 in order to maximize the responsiveness and energy efficiency of the vehicle 105 (e.g., by supplying the correct amount of energy to the motor 195 at any given time), to maximize lifespan and energy storage capacity of the battery 190, and to prevent damage to any vehicle systems or subsystems related to charging or discharging of the battery 190. In some vehicles, the battery 190 or battery management controller (BMC) 184 may include thermal management systems including but not limited to fans, radiators, liquid coolant systems, pumps, heaters, and thermoelectric heating/cooling junctions, and temperature sensors on the battery 190 or on terminals or cables connected to the battery. In such cases, monitoring and management of battery temperature may also be a function of the BMC 184, which may be capable of activating battery heating or cooling systems when battery temperature and other conditions make this advisable. In some embodiments, the BMC 184 may be the same as, or may be a portion of, the vehicle control unit 110, or software executing thereon. In other embodiments, the BMC may be a standalone hardware or firmware module, or may be part of or combined with other engines or control units within the vehicle.

A reader of ordinary skill in the art will understand that other components or arrangements of components may be found in an EV, hybrid vehicle, or plug-in hybrid vehicle, and that some components described herein may not be present in all vehicles.

Figure 3:
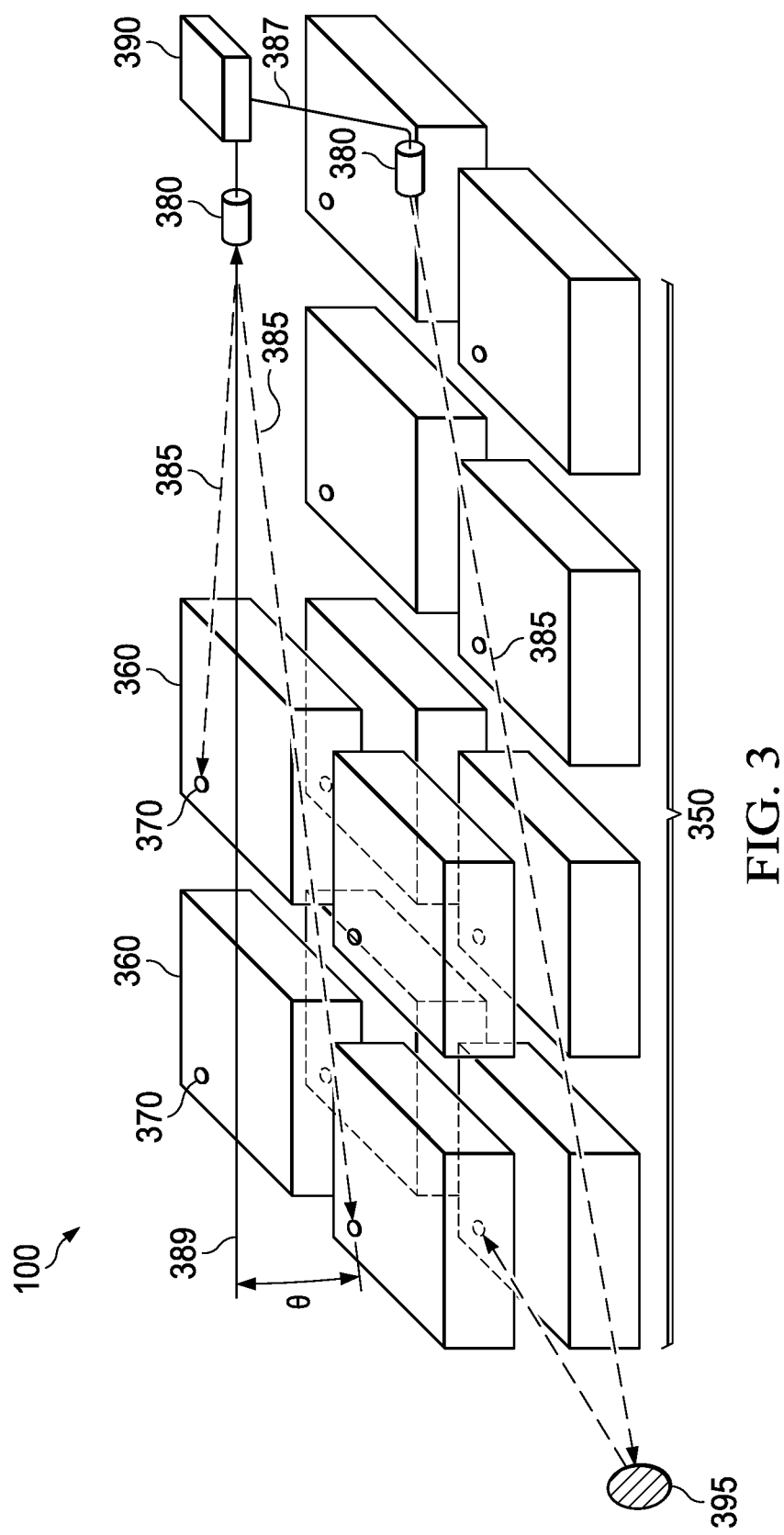
FIG. 3 is a schematic, perspective view of at least a portion of an example FSOC battery management system, in accordance with at least one embodiment of the present disclosure.

FIG. 3 is a schematic, perspective view of at least a portion of an example FSOC battery management system 100, in accordance with at least one embodiment of the present disclosure. Visible is at least a portion of a battery 350, which is made up of multiple battery modules 360. Each battery module includes a module optical transceiver 370, which communicates with a BMS optical transceiver 380 that is in communication with a BMS electronic control unit (ECU) 390. In some embodiments, communication between the BMS optical transceivers 380 and the BMS ECU 390 may be wired (e.g., through wires 387). In other embodiments, this communication may also be through one or more additional FSOC links. In still other embodiments, the BMS optical transceivers 380 are part of or are attached to or built into the BMS ECU 390. In some embodiments, the BMS ECU 390 is the same as, or is a portion of, the battery management controller 184 or vehicle control unit 110 of FIG. 2. In other embodiments, the BMS ECU 390 may be a standalone hardware or firmware device in communication with the battery management controller 184 or vehicle control unit 110.

Each BMS optical transceiver 380 is configured to communicate with multiple module optical transceivers 370 over optical signal links 385. The optical signal links 385 may for example be laser beams, although other types of optical links may be used instead or in addition. In an example, each BMS optical transceiver 380 is capable of communicating with module optical transceivers 370 within an angle of θ degrees from a centerline 389 of the BMS optical transceiver 380. In some cases, an optical signal link may be reflected by one or more mirrors 395, to facilitate communication around corners or in otherwise hard-to-reach areas.

The exemplary arrangement of FIG. 3 depicts a plurality of battery modules 360 arranged spatially in layers. The BMS optical transceivers 380 establish line-of-sight free-space optical communication links with the module optical transceivers 370 associated with the respective battery modules 360. The resulting communication links (e.g., free-space optical communication or FSOC links) 385 are bi-directional. From the battery modules 360, the BMS ECU 390 receives various types of battery-health and status-related data such as current, voltage, temperature, and state of charge. The BMS ECU 390 can transmit to the battery modules 360, via the FSOC links 385, commands of various kinds, including requests for specific measurements and operational adjustments to ensure proper balancing among the battery modules. In some embodiments, the BMS ECU 390 cyclically communicates with the various battery modules 360 in turn. Since all reported status information from the battery modules 360 and all commands from the BMS ECU 390 are carried over the FSOC links 385, the only electrical connections involving the battery modules may be the connections to the high-voltage (power) bus of the vehicle.

Module position may for example be determined by signal direction, signal magnitude, signal time-of-flight, and/or direct addressing. This may for example reduce the time and effort required for service and assembly, if module positions do not need to be tracked or programmed. It should also be noted that the inherent directionality of the FSOC links avoids the need for the complex beam-forming antenna arrays an RF solution may require.

Figure 4:
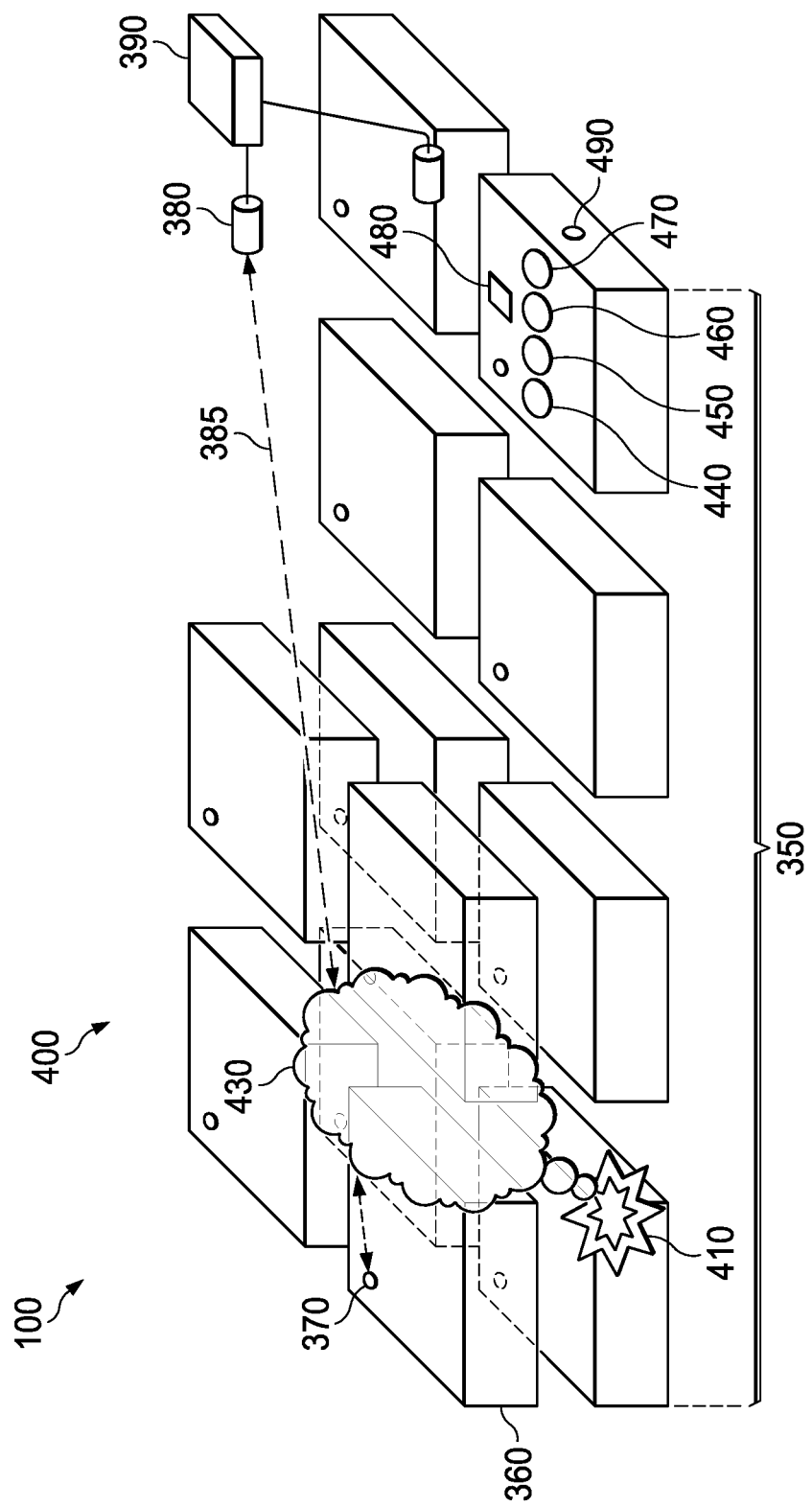
FIG. 4 is a schematic, perspective view of at least a portion of an example FSOC battery management system, in accordance with at least one embodiment of the present disclosure.

FIG. 4 is a schematic, perspective view of at least a portion of an example FSOC battery management system 100, in accordance with at least one embodiment of the present disclosure. Visible are the battery modules 360 of the battery 350, along with the module optical transceivers 370, BMS optical transceivers 380, the communication links (e.g., FSOC links) 385, and the BMS ECU 390. Also visible are a battery module current sensor 440, battery module voltage sensor 450, battery module temperature sensor 460, battery module charge sensor 470, battery module processor 480, and battery module vent 490. Depending on the implementation, other sensors or components, or combinations thereof, may be present in a battery module 360, and some of the listed sensors or components may be absent from some battery modules 360.

Also visible is a fire 410 in one of the modules 360 (e.g., caused by a runaway exothermic reaction of the battery chemicals), which is generating smoke 430 that may, for example, exit the battery module 360 through one or more battery module vents 490. In the example shown in FIG. 4, another aspect of the FSOC battery management system 100 is a fire detection capability 400 to detect fires 410 caused by thermal runaway in battery modules 360, more quickly than with battery module temperature sensors 460 alone, especially if the fire 410 occurs in a location that is not close to one of the battery module temperature sensors 460. As illustrated in FIG. 4, smoke 430 from a fire 410 can attenuate one or more free-space optical communication links 385, thus permitting the BMS ECU 390 to detect the fire based on the signal attenuation, potentially before the fire is detected by any of the module temperature sensors 460. Since the BMS ECU 390 is aware of the location of each battery module 360, the information about which FSOC signals 385 are attenuated, and which are unaffected, may help the BMS ECU 390 determine which module is failing. Early detection of a fire allows more time for the BMS ECU 390 (or other vehicle systems or subsystems) to enact possible countermeasures, including but not limited to (a) taking the battery module offline, (b) cooling the battery module, (c) activating a fire suppression system, or (d) warning the vehicle's driver and/or passengers that a fire is in progress. In some cases, the information provided by attenuation of FSOC signals may not be sufficient for the BMS ECU 390 to isolate the location of the fire to a single module. In such cases, the BMS ECU 390 may for example employ countermeasures for all battery modules along the line of site of the attenuated FSOC link. In other instances, smoke ay fill the entire battery compartment, such that the failing module cannot be identified. In such cases, global measures may be taken, such as taking the entire battery offline, cooling the entire battery, etc.

In some embodiments, each battery module processor 480 may be configured to gather data about its battery module 360 from its respective battery module sensors 440, 450, 460, and 470, and transmit them in one or more digital or analog formats to the BMS ECU 390 via the module's optical transceiver 370. However, in other embodiments the battery module processor 480 may perform other tasks or analyses, including but not limited to (a) determining a state of health of the battery module 360 based on the outputs of the sensors 440, 450, 460, and 470, (b) performing cell balancing operations, (c) performing cell charge or discharge management operations, or (d) processing data for service and diagnostic tests. Depending on the implementation, the FSOC battery management system 100 could also be applied to hybrid vehicles as well as electric vehicles (EVs), although the benefits may be greater for EVs, since there may be a larger number of battery modules in an EV.

Figure 5:
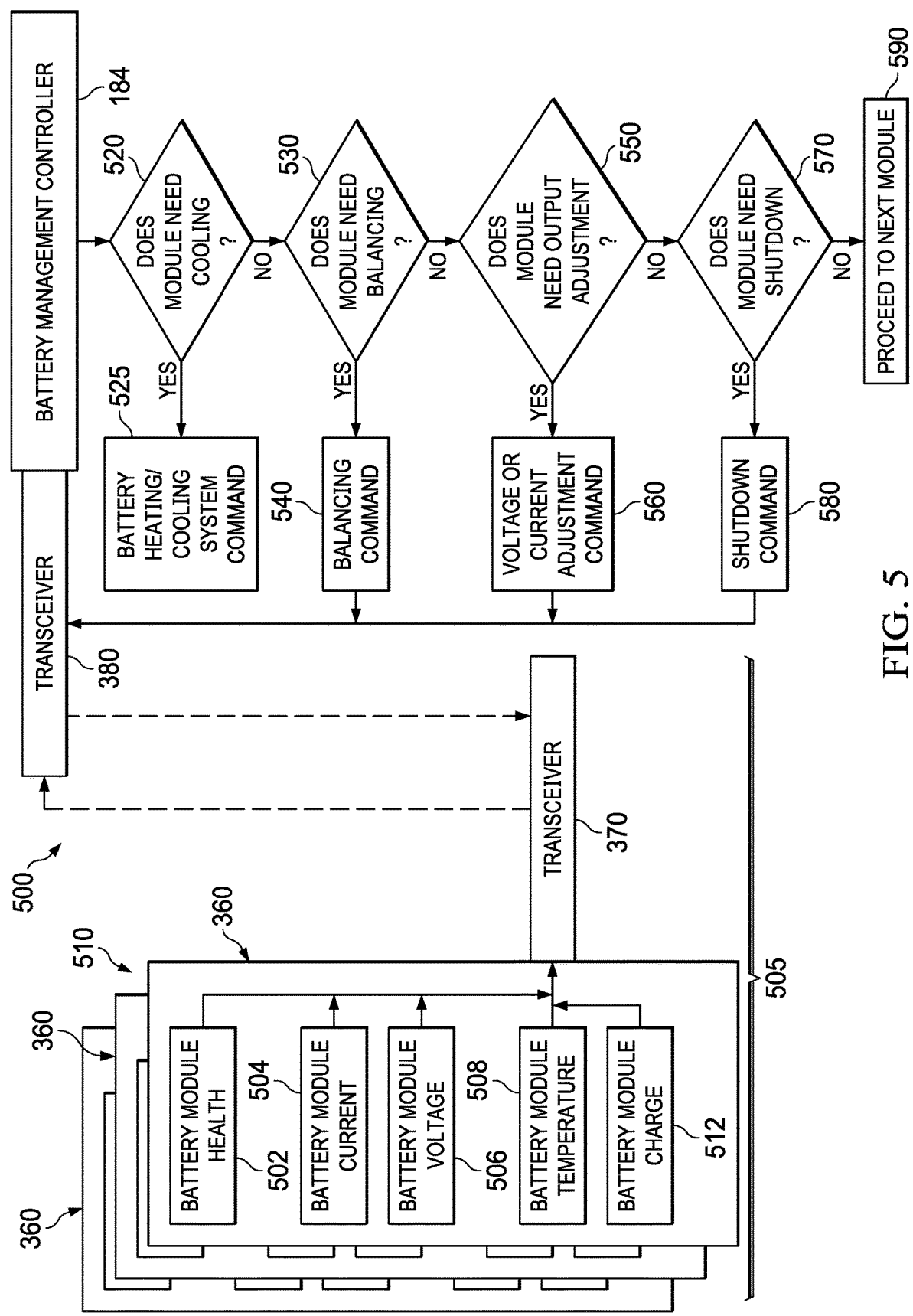
FIG. 5 is a flow diagram of an example FSOC battery management method of the FSOC battery management system, in accordance with at least one embodiment of the present disclosure.

FIG. 5 is a flow diagram of an example FSOC battery management method 500 of the FSOC battery management system 100, in accordance with at least one embodiment of the present disclosure. It is understood that the steps of method 500 may be performed in a different order than shown in FIG. 5, additional steps can be provided before, during, and after the steps, and/or some of the steps described can be replaced or eliminated in other embodiments. One or more of steps of the method 500 can be carried out by one or more devices and/or systems described herein, such as components of the vehicle control unit 110 or battery management controller 184 of FIG. 2, the battery management system electronic control unit (BMS ECU) 390 of FIG. 3, and/or the processor circuit 850 of FIG. 8.

In step 505, each battery module 360 senses and transmits (e.g., via a module optical transceiver 370) a set of battery module data 510, including for example a battery module health status 502, battery module current 504, battery module voltage 506, battery module temperature 508, and battery module charge 512. The battery module data 510 is received for example by a battery management controller 184 (e.g., via a BMS optical transceivers 380), which may perform other steps of the method.

In step 520, the method 500 includes determining whether the battery module 360 needs heating or cooling. If yes, execution proceeds to step 525. If no, execution proceeds to step 530.

In step 525, the method 500 includes issuing commands to a battery thermal management system to heat or cool the battery module, as appropriate. In some embodiments, heating or cooling of individual battery modules 360 may be performed. In other embodiments, the entire battery, including all the battery modules 360, may be heated or cooled as a single unit. Depending on the implementation, execution may then proceed, for example, to step 530 or step 590.

In some embodiments, each battery module is configured to request or command individual cooling or heating, in which case some portions of steps 520 and/or 525 may be performed on a battery module processor associated with the battery module.

In step 530, the method 500 includes determining whether the battery module 360 needs to be balanced. If yes, execution proceeds to step 540. If no, execution proceeds to step 550.

In step 540, the method 500 includes issuing a balancing command to the battery module 360 (e.g., via the BMS transceiver 380). Depending on the implementation, execution may then proceed, for example, to step 550 or step 590.

In step 550, the method 500 includes determining whether the output of the battery module 360 needs to be adjusted. This may involve, for example, reducing the output current of the battery module 360. If yes, execution proceeds to step 560. If no, execution proceeds to step 570.

In step 560, the method 500 includes issuing an output adjustment command to the battery module 360 (e.g., via the BMS transceiver 380). Depending on the implementation, execution may then proceed, for example, to step 570 or step 590.

In step 570, the method 500 includes determining whether the battery module 360 needs to be shut down. This may occur, for example, if the battery module 360 is overheated or giving other anomalous sensor readings. In some embodiments, it may also occur if the output voltage, output current, or charge of the battery module 360 is outside a specified threshold, either in absolute terms or relative to other modules 360 of the battery. If yes, execution proceeds to step 580. If no, execution proceeds to step 590.

In step 580, the method 500 includes issuing a shutdown command to the battery module 360 (e.g., via the BMS transceiver 380). Execution may then proceed to step 590.

In step 590, the method 500 includes switching to the next battery module 360 (e.g., in a pre-determined sequence), and then returning to step 505.

This flow diagram is provided for exemplary purposes; a person of ordinary skill in the art will recognize myriad variations that nonetheless fall within the spirit and content of the present disclosure. For example, the logic steps of FIG. 5 are shown as sequential. However, similar logic could be parallel, massively parallel, object oriented, real-time, event-driven, or otherwise, while accomplishing the same or similar functions.

Figure 6:
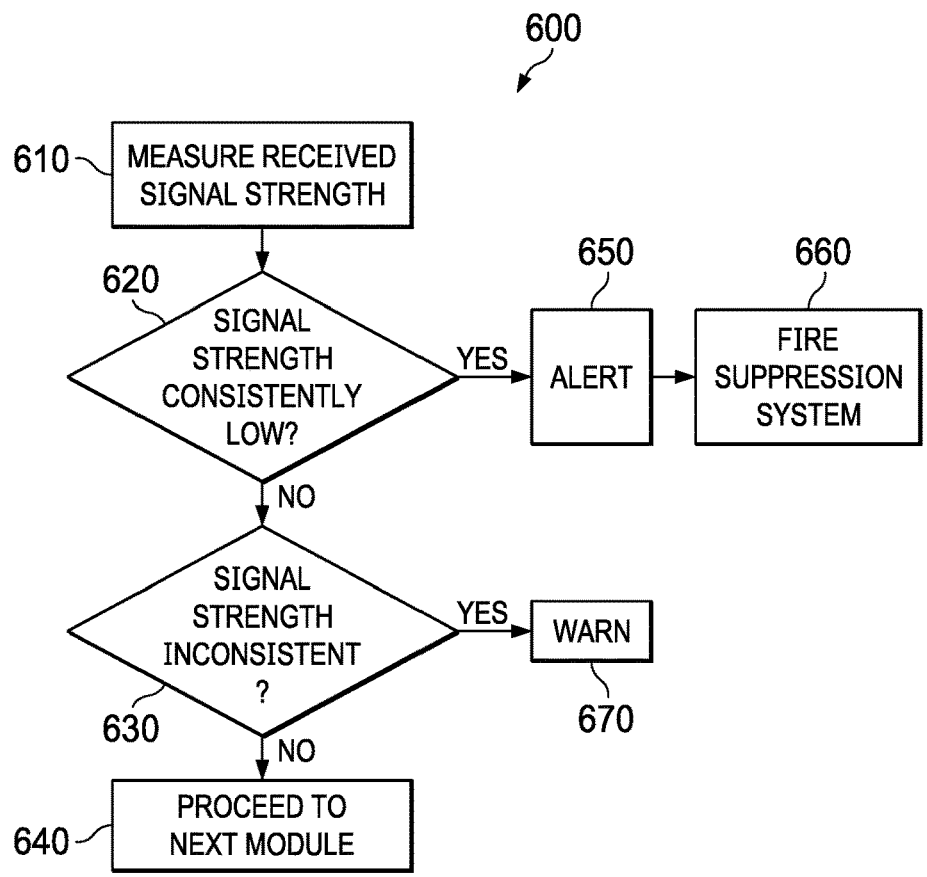
FIG. 6 is a flow diagram of an example fire detection method of the FSOC battery management system, in accordance with at least one embodiment of the present disclosure.

FIG. 6 is a flow diagram of an example fire detection method 600 of the FSOC battery management system 100, in accordance with at least one embodiment of the present disclosure. It is understood that the steps of method 600 may be performed in a different order than shown in FIG. 6, additional steps can be provided before, during, and after the steps, and/or some of the steps described can be replaced or eliminated in other embodiments. One or more of steps of the method 600 can be carried out by one or more devices and/or systems described herein, such as components of the vehicle control unit 110 or battery management controller 184 of FIG. 2, the battery management system electronic control unit (BMS ECU) 390 of FIG. 3, and/or the processor circuit 850 of FIG. 8.

In step 610, the method 600 includes measuring the received signal strength of the FSOC link to a particular battery module. Execution then proceeds to step 620.

In step 620, the method 600 includes checking whether the signal strength of the FSOC link is consistently low. This may occur if, for example, the signal strength falls below a specified threshold for a specified time or a number of sequential measurements. If yes, execution proceeds to step 650. If no, execution proceeds to step 630.

In step 630, the method 600 includes checking whether the signal strength of the FSOC link is intermittently low. This may occur if, for example, the signal strength falls below a specified threshold for a number of non-sequential measurements within a specified time period. If yes, execution proceeds to step 670. If no, execution proceeds to step 640.

In step 640, the method 600 includes switching to the next battery module (e.g., in a pre-determined sequence), and then returning to step 610.

In step 650, the method 600 includes issuing a fire alert. The fire alert may for example trigger countermeasure events such as (a) taking the entire battery offline, (b) cooling the entire battery, (c) activating a fire suppression system 660, and/or (d) warning the vehicle's driver and/or passengers that a fire is in progress.

In step 670, the method 600 includes issuing a fire warning. The fire warning may be the same as the fire alert, or may be different. The fire warning may for example trigger countermeasure events such as (a) taking the battery module offline, (b) cooling the battery module, or (c) warning the vehicle's driver and/or passengers that a battery failure may be imminent.

This flow diagram is provided for exemplary purposes; a person of ordinary skill in the art will recognize myriad variations that nonetheless fall within the spirit and content of the present disclosure. For example, the logic steps of FIG. 6 are shown as sequential. However, similar logic could be parallel, massively parallel, object oriented, real-time, event-driven, or otherwise, while accomplishing the same or similar functions.

Figure 7:
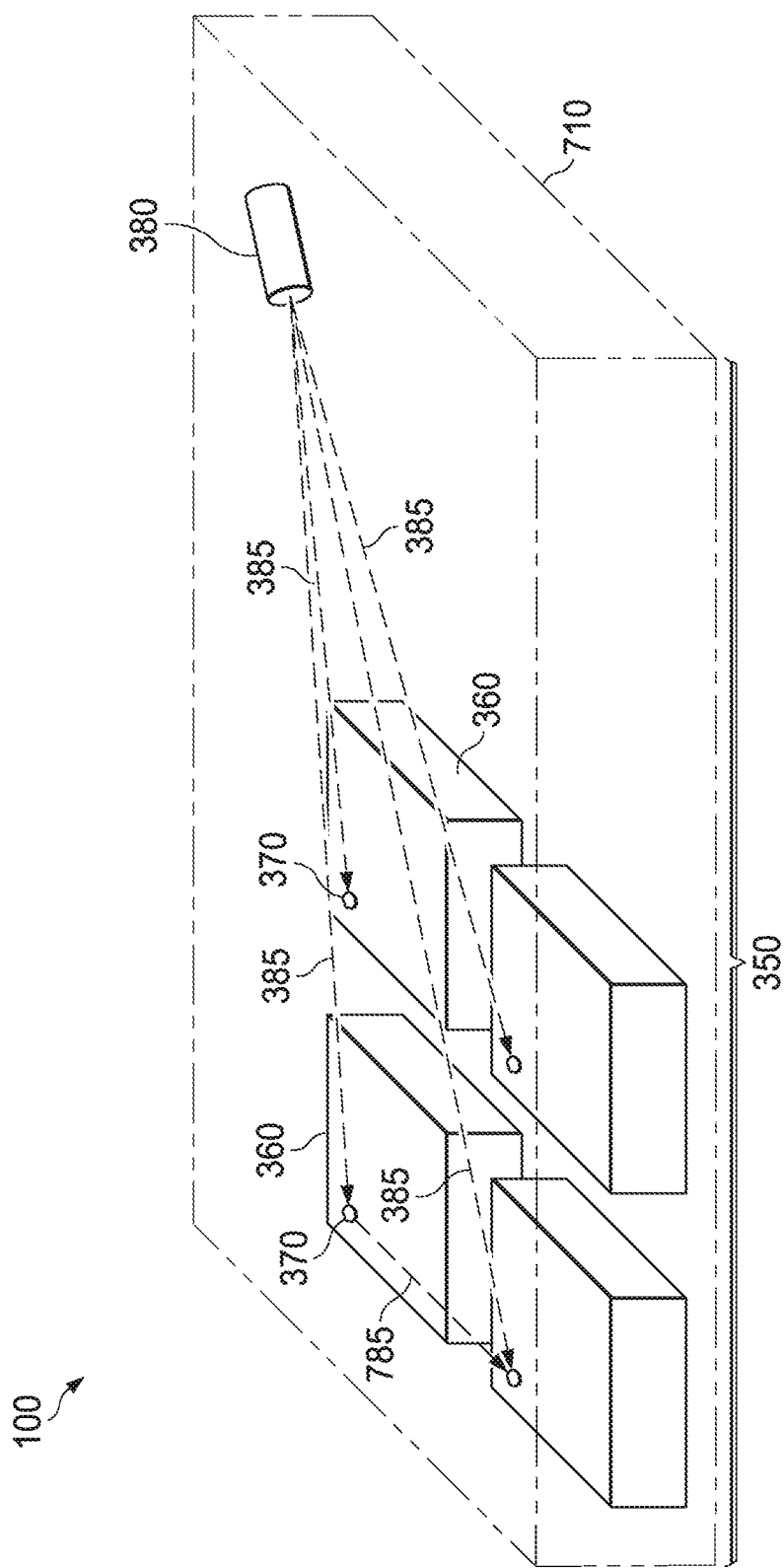
FIG. 7 is a schematic, perspective view of at least a portion of an example FSOC battery management system, in accordance with at least one embodiment of the present disclosure.

FIG. 7 is a schematic, perspective view of at least a portion of an example FSOC battery management system 100, in accordance with at least one embodiment of the present disclosure. Visible are the battery modules 360 of the battery 350, along with the module optical transceivers 370, BMS optical transceiver 380, the communication links (e.g., FSOC links) 385, and the BMS ECU 390. In the example of FIG. 7, the battery modules 360 are also capable of forming inter-module FSOC links 785, such that battery modules may communicate directly with one another, without necessarily communicating through a BMS optical transceiver 380. In some embodiments, battery modules 360 form a mesh network or ad-hoc network 706 for inter-module communication and/or communication with the BMS optical transceiver 380.

Although the FSOC links 385 and 785 are shown as linear (e.g., laser beams), FSOC links may also be formed through multiplexed broad beam or broadcast optical communication, such that the same light transmission from the BMS is received by multiple module optical transceivers but acted upon only by the module specifically addressed in the communication. Similarly, multiplexed broad beam or broadcast transmissions from one battery module 360 may be received by other battery modules 360, but may be ignored by modules not specifically addressed in the communication, or by the BMS optical transceiver 380 if not specifically addressed. Other free-space optical communication arrangements can also be used.

In the example of FIG. 7, the battery 350 contains an intra-battery fluid 710 that may fully or partially submerge at least some of the battery modules 360. The fluid 710 may be used for example as a cooling medium (e.g., for flood cooling, spray cooling, evaporative cooling, radiative cooling, or other cooling of the battery modules 360), or may serve a role in fire suppression, electrical isolation of the battery modules, as ballast to alter the center of gravity of the vehicle, or for other reasons. In embodiments that include or can include an intra-battery fluid 710, the wavelengths of light employed by the FSOC links 385 and 785 may be selected to have high transmission through the fluid 710, such that the FSOC links 385 and 785 can function (e.g., transmit data bidirectionally) regardless of whether or not the fluid 710 is present within the battery 350. In some embodiments, optical transceivers 370 and 380 may adjust beam angled to account for the index of refraction of the fluid.

Figure 8:
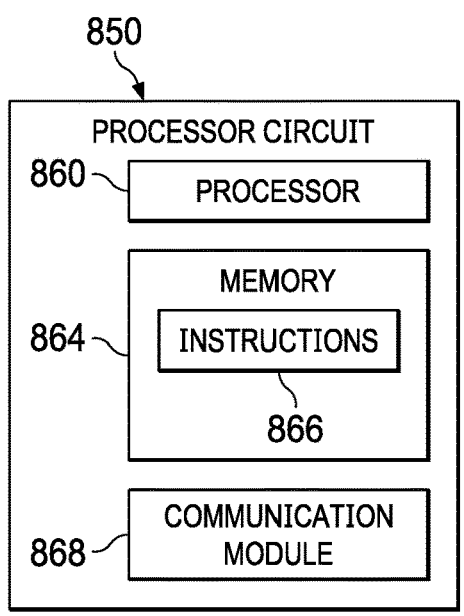
FIG. 8 is a schematic diagram of a processor circuit, in accordance with at least one embodiment of the present disclosure.

FIG. 8 is a schematic diagram of a processor circuit 850, in accordance with at least one embodiment of the present disclosure. The processor circuit 850 may for example be implemented in the FSOC battery management system 100, vehicle control unit 110, battery management controller 184, battery management system electronic control unit 390, battery module processor 480, or other devices or workstations (e.g., third-party workstations, network routers, etc.), or on a cloud processor or other remote processing unit, as necessary to implement the method. As shown, the processor circuit 850 may include a processor 860, a memory 864, and a communication module 868. These elements may be in direct or indirect communication with each other, for example via one or more buses.

The processor 860 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 860 may also comprise another hardware device, a firmware device, or any combination thereof configured to perform the operations described herein. The processor 860 may also be implemented as a combination of computing devices, e.g., a combination of a DSP and a microprocessor, a plurality of microprocessors, one or more microprocessors in conjunction with a DSP core, or any other such configuration.

The memory 864 may include a cache memory (e.g., a cache memory of the processor 860), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 864 includes a non-transitory computer-readable medium. The memory 864 may store instructions 866. The instructions 866 may include instructions that, when executed by the processor 860, cause the processor 860 to perform the operations described herein. Instructions 866 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 868 can include any electronic circuitry and/or logic circuitry to facilitate direct or indirect communication of data between the processor circuit 850, and other processors or devices. In that regard, the communication module 868 can be an input/output (I/O) device. In some instances, the communication module 868 facilitates direct or indirect communication between various elements of the processor circuit 850 and/or the FSOC battery management system 100. The communication module 868 may communicate within the processor circuit 850 through numerous methods or protocols. Serial communication protocols may include but are not limited to US SPI, $I^2C$, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, data transmission between the processor and central server, or readings from the FSOC battery management system) may be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

A person of ordinary skill in the art, after becoming familiar with the disclosures herein, will appreciate that as compared with present battery management systems, the FSOC battery management system advantageously provides improvements including, but not limited to: reduced weight, reduced wiring harness cost and complexity, improved galvanic isolation, reduced risk of component deterioration, improved support for modular battery stack designs, reduced vulnerability to multipath interference; improved detection of thermal runaway, reduced susceptibility to RF interference or attack, increased security, simpler electromagnetic compliance, lower RF emissions, and improved potential for use with liquid cooling systems.

A number of variations are possible on the examples and embodiments described above. For example, the systems, methods, or devices disclosed herein may be applied to electric, hybrid, or internal combustion vehicles. They can be applied to stationary (e.g., non-vehicular) batteries, or to batteries employed in motorcycles, bicycles, trucks, vans, campers, watercraft, or aircraft. They can be applied to vehicular batteries other than traction batteries (e.g., a starter battery for an internal combustion vehicle), or to household energy storage batteries, grid-scale batteries, or any other battery that includes multiple battery modules. The technology described herein may be implemented on manually controlled, driver-assist, or fully autonomous vehicles. The technology described herein may be implemented in diverse combinations of hardware, software, and firmware, depending on the implementation or as necessitated by the structures and modules already present in existing electric, hybrid, and plug-in hybrid vehicles. A FSOC communication link can be implemented using visible, infrared, or and ultraviolet light communication, whether based on coherent light (e.g., lasers), monochromatic light (e.g., LEDs), light across a broad range of wavelengths, or light of multiple wavelengths, or combinations thereof, in either narrow-beam, broad-beam, or broadcast formats, or combinations thereof, and may be configured for unidirectional or bidirectional digital or analog data transfer, whether point-to-point, multiplexed, networked, or otherwise.

Accordingly, the logical operations making up the embodiments of the technology described herein may be referred to variously as operations, steps, objects, elements, components, modules, units, or layers. Furthermore, it should be understood that these may occur or be arranged in any order, unless explicitly claimed otherwise or a specific order is inherently necessitated by the claim language or by the nature of the component or step.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the FSOC battery management system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the FSOC battery management system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. For example, some embodiments of the proposed system would also include removable fuel cell vehicles. Once the batteries, inverters, converters, fuel cells, etc. are finished with the current use, they can be readily reinstalled back into the vehicle. Additionally, sensors external to the vehicle may be employed to provide or supplement any of the sensor data described hereinabove. Alternatively, machine learning algorithms or other AI systems may be used to estimate variables from sparse, noisy, or entwined data streams without departing from the spirit of the present disclosure. Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A vehicle comprising:
   a battery management system comprising:
      an energy storage device configured to power the vehicle, the energy storage device comprising:
         a battery module;
         at least one battery module sensor associated with the battery module;
         a battery module processor associated with the battery module; and
         a battery module optical transceiver associated with the battery module;
      a control unit configured to control the energy storage device; and
      a control unit optical transceiver associated with the control unit and configured for bidirectional free-space optical communication with the battery module optical transceiver via a free-space optical communication link,
   wherein the battery module processor is configured to receive sensor readings from the at least one battery module sensor and transmit information about the sensor readings to the control unit via the free-space optical communication link, and
   wherein the control unit is configured to, based on the information about the sensor readings, send commands to the battery module processor via the free-space optical communication link.

2. The vehicle of claim 1, wherein the at least one battery module sensor comprises a temperature sensor, a current sensor, a voltage sensor, or a charge sensor.

3. The vehicle of claim 1, wherein the commands comprise at least one of a heating command, a cooling command, a balancing command, an output voltage or output current adjustment command, or a shutdown command.

4. The vehicle of claim 1, wherein the free-space optical communication link comprises laser light.

5. The vehicle of claim 4, wherein the control unit is configured to determine a position of the battery module based on an angle, a signal strength, or a time of flight of the laser light, or an address encoded in the laser light.

6. The vehicle of claim 1, wherein the control unit is configured to detect a fire in the battery module based on a signal strength of the free-space optical communication link.

7. The vehicle of claim 1, wherein the energy storage device further comprises a fluid at least partially surrounding the battery module.

8. The vehicle of claim 7, wherein a wavelength of the free-space optical communication link is selected for transmission through the fluid, such that the free-space optical communication link can transmit data bidirectionally through the fluid.

9. The vehicle of claim 7, wherein the free-space optical communication link comprises a reflector.

10. The vehicle of claim 1, wherein the energy storage device comprises a plurality of battery modules, and wherein each battery module of the plurality of battery modules comprises:
at least one battery module sensor associated with the battery module;
a battery module processor associated with the battery module; and
a battery module optical transceiver associated with the battery module and configured for bidirectional free-space optical communication with the control unit optical transceiver via a free-space optical communication link associated with the battery module,
wherein the battery module processor is configured to receive sensor readings from the at least one battery module sensor and transmit the sensor readings to the control unit via the free-space optical communication link associated with the battery module.

11. The vehicle of claim 10, wherein at least one battery module of the plurality of battery modules is positioned on a different plane from another battery module of the plurality of battery modules.

12. The vehicle of claim 11, further comprising a second control unit optical transceiver associated with the control unit and configured for bidirectional free-space optical communication with the battery module optical transceivers of the at least one battery module positioned on the different plane.

13. A battery management system comprising:
an energy storage device configured to power a vehicle, the energy storage device comprising:
a plurality of battery modules, wherein each battery module of the plurality of battery modules comprises:
at least one sensor;
a processor; and
a battery module optical transceiver;
a control unit configured to control the storage device; and
at least one control unit optical transceiver associated with the control unit and configured for bidirectional free-space optical communication with the respective battery module optical transceivers of the plurality of battery modules via a plurality of respective free-space optical communication links,
wherein each respective battery module processor is configured to receive respective sensor readings from the respective at least one sensor and transmit information about the respective sensor readings to the control unit via the respective free-space optical communication link, and
wherein the control unit is configured to, based on the information about the respective sensor readings, send commands to the respective battery module processors via the respective free-space optical communication links.

14. The battery management system of claim 13, wherein each of the respective sensor readings comprises at least one of a battery module a temperature, a current, a voltage, or a charge.

15. The battery management system of claim 13, wherein the commands comprise at least one of a heating command, a cooling command, a balancing command, an output voltage or output current adjustment command, or a shutdown command.

16. The battery management system of claim 13, wherein at least one free-space optical communication link of the respective free-space optical communication links comprises laser light.

17. The battery management system of claim 16, wherein the control unit is configured to determine a position of at least one battery module of the plurality of battery modules, based on an angle, a signal strength, or a time of flight of the laser light, or an address encoded in the laser light.

18. The battery management system of claim 13, wherein the control unit is configured to detect a fire in a battery module based on a signal strength of the respective free-space optical link of the battery module.

19. The battery management system of claim 13, wherein the energy storage device further comprises a fluid at least partially surrounding the battery module, and wherein a wavelength of the respective free-space optical communication links is selected for transmission through the fluid, such that the respective free-space optical communication links can transmit data bidirectionally through the fluid.

20. A method of controlling a battery of a vehicle, the method comprising:
providing an energy storage device configured to power the vehicle, the energy storage device comprising:
a plurality of battery modules, wherein each battery module of the plurality of battery modules comprises:
at least one sensor;
a processor; and
a battery module optical transceiver;
providing a control unit configured to control the energy storage device; and
with a control unit optical transceiver associated with the control unit, establishing bidirectional free-space optical communication with the respective battery module optical transceivers of the plurality of battery modules via a plurality of respective free-space optical communication links,
with each respective battery module processor, receiving respective sensor readings from the respective at least one sensor and transmitting information about the respective sensor readings to the control unit via the respective free-space optical communication link; and
with the control unit, based on the information about the respective sensor readings, send commands to the respective battery module processors via the respective free-space optical communication links,
wherein the commands comprise at least one of a heating command, a cooling command, a balancing command, an output voltage or output current adjustment command, or a shutdown command.

* * * * *